(12) United States Patent
Rebalski

(10) Patent No.: US 6,658,201 B1
(45) Date of Patent: Dec. 2, 2003

(54) DATA STORAGE DEVICE HAVING MULTIPLE HEADS TRAVELING IN OPPOSITE DIRECTIONS FOR CAPACITY AND THROUGHPUT OPTIMIZATION

(75) Inventor: Jan F. Rebalski, Foothill Ranch, CA (US)

(73) Assignee: Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/339,773

(22) Filed: Jun. 24, 1999

(51) Int. Cl.[7] .................................................. H04N 5/91
(52) U.S. Cl. ........................ 386/98; 386/125; 386/126; 369/44.37; 369/124.09
(58) Field of Search ................................. 386/125–126, 386/95, 96, 105, 122, 98; 369/124.09, 44.37; H04N 5/91

(56) References Cited

U.S. PATENT DOCUMENTS

| | | | | |
|---|---|---|---|---|
| 4,789,979 A | * | 12/1988 | Hiraoka et al. | 369/275.4 |
| 5,043,963 A | * | 8/1991 | Iwamoto | 369/30.91 |
| 5,126,851 A | | 6/1992 | Yoshimura et al. | 358/335 |
| 5,134,499 A | | 7/1992 | Sata et al. | 358/342 |
| 5,257,111 A | * | 10/1993 | Kakuyama | 386/125 |
| 5,260,801 A | * | 11/1993 | Temma et al. | 386/122 |
| 5,420,690 A | * | 5/1995 | Koishi | 386/105 |
| 5,506,825 A | * | 4/1996 | Gushima et al. | 386/96 |
| 5,666,462 A | * | 9/1997 | Park | 386/125 |

* cited by examiner

Primary Examiner—Vincent Boccio
(74) Attorney, Agent, or Firm—Wagner, Murabito, & Hao LLP

(57) ABSTRACT

Methods and systems for improving the storage capacity and data throughput of a digital mass storage device. The novel optimizations can be applied to a disk drive, either a hard disk drive or a disk drive having removable media, such as magnetic and optical disk drive technologies. The present invention provides at least two disk drive heads for reading and writing information from two different spinning media surfaces, e.g., platters or disks. If the disk is a read-only device, then the heads only perform the read function. A constant angular velocity drive mechanism is used meaning the rotational speed of the media is constant regardless of the head's position with respect to the media. In operation, during a media transfer, the first head accesses data by starting at the outside regions ("high track rates") of the disk media and traversing inward towards the inner regions ("low track rates"). The second head, moving the opposite direction but in synchronization with the first head, starts accessing data in the inner regions of its disk media and traverses towards the outer regions. A data file is portioned and its portions are accessed using both heads combined to provide a uniform and high data throughput. The sectors are specially mapped and the data is interleaved to provide a maximum throughput. Capacity is increased because much, if not all, of the inner regions of the disk media are used in the present invention while still maintaining a high and uniform data throughput.

20 Claims, 15 Drawing Sheets

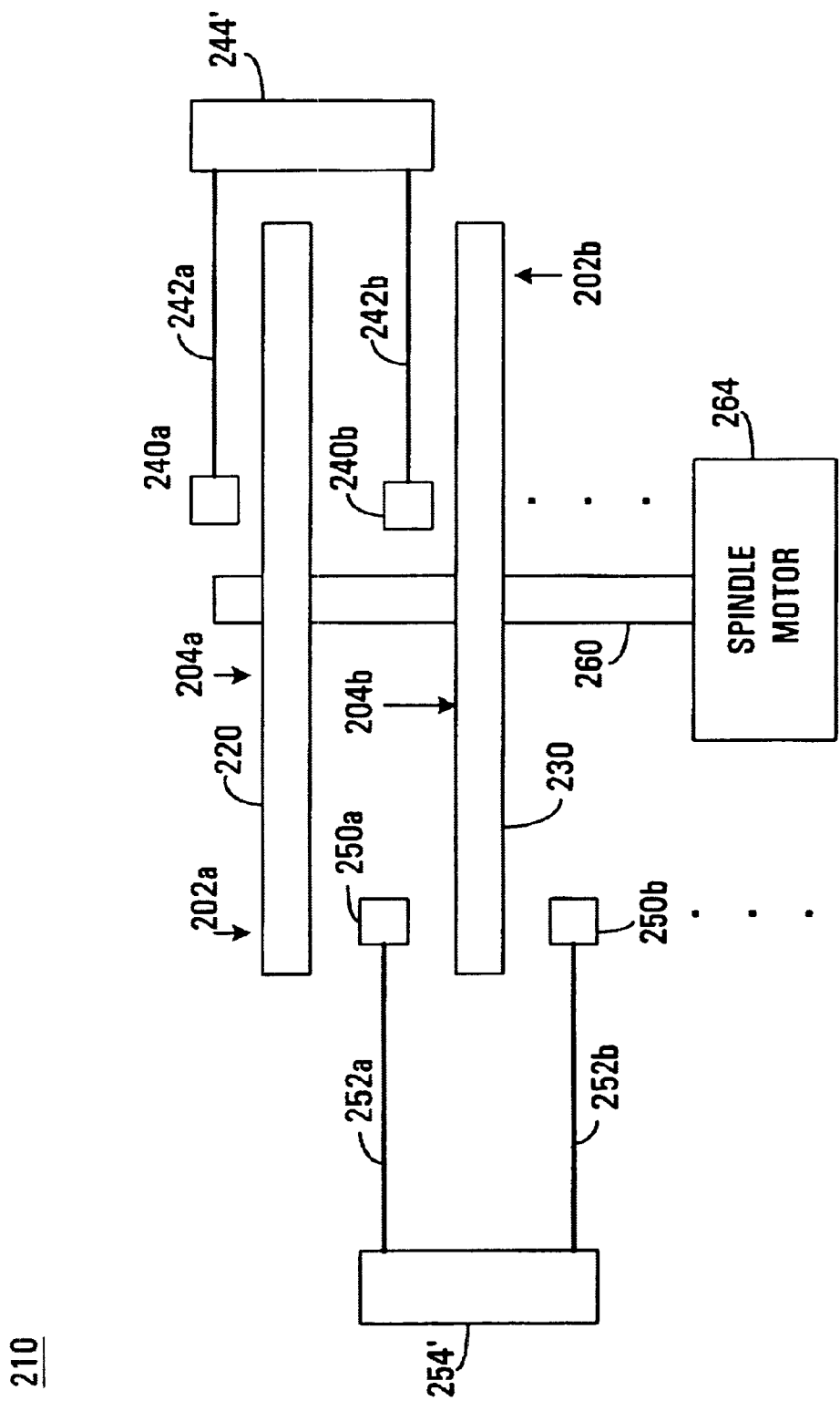

DATA STORAGE DEVICE HAVING MULTIPLE HEADS TRAVELING IN OPPOSITE DIRECTIONS FOR CAPACITY AND THROUGHPUT OPTIMIZATION

BACKGROUND OF THE INVENTION

1. Field of the Invention

The present invention relates to the field of mass storage technology. More specifically, the present invention relates to methods and systems for improving the storage capacity and throughput of a digital mass storage device, such as a disk drive.

2. Related Art

Digital information can be stored magnetically and optically on rotating storage media often called "disk media" or platters. The digital storage media can be removable, as in the case of a floppy disk or optical compact disk (CD) or the platters can be non-removable such as in a hard disk. The digital information maintained in this disk storage media is stored in annular shaped tracks that are positioned at different radii from the center of the disk media. Several arc-shaped sectors can reside within each track. The digital information is read from the disk media by a head disk assembly (HDA) which contains a head that is positioned over the tracks of the rotating disk media. Disk drives that are used to store and retrieve audio/video digital information are called AV drives.

Data can be recorded using a constant linear velocity (CLV) technique in which the data density recorded per linear inch of the disk media is constant but the media spins at different rates depending on the radius of the head. The second technique is the constant angular velocity (CAV) technique. In both techniques, the density (e.g., bits/inch) of the information stored within the tracks is constant. In CLV technique, as the head of the disk drive moves across the tracks of the disk media, the rotation speed of the disk media is varied by the disk drive to maintain a constant linear velocity of the head with respect to the recorded information. As the head moves toward the center, the rotation speed is increased because the circumferences of the inner tracks are smaller than the circumferences of the outer tracks. By increasing the rotation speed, the linear velocity, and therefore the data rate, is held constant in the CLV technique. Conversely, in the CAV technique, the rotation speed of the disk media is held constant regardless of the track position of the head. Therefore, in the CAV technique, the data rate of digital information accessed by the head decreases as the read head travels from the outer tracks of the disk media to the inner tracks.

The CLV reading technique is not particularly advantageous because each time the head is moved from one position to another, e.g., in response to a "seek" command, the rotation speed of the disk media needs to be adjusted for the new position. During a "seek" command, the head of the disk drive is instructed to move from its current position to a new position in order to access digital information from the disk media. In the CLV technique, the rotation speed of the disk media must be adjusted based on the new track position of the head. While the head can be rapidly positioned from its current position to the new position, it takes longer for the spindle motor of the disk drive to reach the target rotation speed for the new head position. Therefore, reading/writing random accessed information from and to a disk media using the CLV technique requires many adjustments to the rotation speed of the disk media and this may severely reduce data throughput.

As result, the CLV technique is disadvantageous for recorded computer information because this information may require many seek commands during retrieval; for each seek, the access time is increased due to the additional time required for the spindle motor to reach its target rotation speed. Moreover, because the rotation speed of the disk media varies based on the head position, the disk drive using the CLV technique requires an advanced speed controllable spindle motor with costly associated control circuitry. Lastly, because the hard drive using the CLV technique is constantly accelerating its spindle motor, torque is required using the CLV technique, which increases the overall power consumption of the disk drive. This makes the CLV technique disadvantageous for battery operated (e.g., portable laptop) computer systems that have limited power stores and are extremely heat sensitive.

However, current CAV techniques also have disadvantages. Because the CAV disk drives operate at a constant angular velocity, the data throughput rate changes depending on the region of the disk media at which the head is positioned. The data throughput rate at the inner tracks of the disk media is significantly lower than the data throughput rate achievable at the outer tracks of the platter. The data throughput rate difference is typically large, with the inner tracks' data rate frequency representing only half of the outer tracks' data rate. As a result, CAV disk drives often operate at a reduced capacity in order to meet certain data throughput rate requirements of some audio/video applications that require high sustained data throughput for normal operation.

For instance, if a particular application demands a high data throughput that cannot be met or maintained using the inner track regions of the disk media, then the disk drive maker will not allow data storage on the inner track regions. Although the data throughput rate is increased, this limitation will inherently reduce the storage capacity of the disk drive because a large potion of the available disk media will not be used by the disk drive. In effect, hardware manufacturers normally forgo the use of the inner surfaces of the media, thereby reducing the potential capacity of the drives, in an effort to guarantee acceptably high data throughput of their drivers.

SUMMARY OF THE INVENTION

Accordingly, what is needed is a disk drive having a high and maintained data throughput rate that also makes use of the potential storage capacity of the disk media in that the inner track regions as well as the outer track regions are used to store data thereon. That is needed further is a disk drive having improved storage capacity and high uniform data throughput rate that also uses constant angular velocity (CAV) techniques. What is also needed is a disk drive having the above characteristics that is used for the storage and retrieval of audio/visual digital information. What is yet needed is a disk drive having the above characteristics that can be implemented within a computer system. As described herein, the present invention offers these advantages and others not recited above but made clear within discussions of the present invention to follow.

Methods and systems are described herein for improving the storage capacity and data throughput of a digital mass storage device, such as a disk drive. The novel optimizations can be applied to a disk drive, either a hard disk drive or a disk drive having removable media, such as magnetic and optical disk drive technologies. The present invention provides at least two disk drive heads for reading and writing information from two different spinning disk media surfaces, e.g., platters or disks. If the disk drive is a read-only device, then the heads only perform the read function. The drive mechanism is a constant angular velocity drive meaning the rotational speed of the disk media is constant regardless of the head's position with respect to the disk media. In operation, during a media transfer, the first head accesses data by starting at the outside regions ("high track rates") of the circular ("disk") media and traversing inward towards the inner regions ("low track rates"). The second head, traversing in the opposite direction, but in synchronization with the first head, starts accessing data at the inner regions of its disk media and traverses towards the outer regions.

Although the data throughput rate of each head varies as the head moves across the tracks, the combined data throughput rate of the two heads remains substantially constant in accordance with the present invention. A data file is portioned and its portions are accessed using both heads combined to provide a uniform and high data throughput rate. The sectors are specially mapped and the data is interleaved to provide a maximum throughput rate. Storage capacity is increased because much, if not all, of the inner regions of the disk media are used in the present invention while still maintaining a high and uniform data throughput rate.

More specifically, an embodiment of the present invention includes a digital storage device comprising: a first head for writing digital data on tracks of a first disk media, the first head moving across the tracks of the first disk media in a first direction; a second head for writing digital data on tracks of a second disk media, the second head moving across the tracks of the second disk media in a second direction opposite to the first direction; and a multiplexer circuit for receiving a digital data stream and for supplying first portions of the digital data stream to the first head and second portions of the digital data stream to the second head, wherein respective size ratios of respective first and second portions are based on corresponding track position ratios of the first and second heads. Embodiments include the above and wherein the first head and the second head write digital data with a substantially constant combined data throughput rate as a result of the respective size ratios and wherein the first direction the first head is from outer tracks to inner tracks of the first disk media and wherein the second direction of the second head is from inner tracks to outer tracks of the second disk media. Embodiments include the above and further comprising a mechanism for spinning the first and second disk media at a constant angular velocity.

Embodiments of the present invention also include a digital storage device comprising: a first set of heads coupled to a first actuator and for reading digital data off of tracks of a first disk media, wherein the first set of heads moves in a direction from outer tracks to inner tracks of the first disk media; a second set of heads coupled to a second actuator and for reading digital data off of tracks of a second disk media, wherein the second set of heads moves from inner tracks to outer tracks of the second disk media in opposite direction to the first set of heads; and a demultiplexer circuit for receiving the digital data from the first set of heads and from the second set of heads and for supplying a single digital data stream therefrom wherein digital data is supplied from the first and second set of heads at a combined throughput rate that is substantially constant.

BRIEF DESCRIPTION OF THE DRAWINGS

FIG. 3B is an embodiment of the present invention having dual sets of disk heads with each head set moving in opposite direction but synchronized in motion.

DETAILED DESCRIPTION OF THE INVENTION

In the following detailed description of the present invention, a dual head disk accessing method and device for uniform high data throughput and increased storage capacity, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Dual Head Storage Device of the Present Invention

Figure 1:
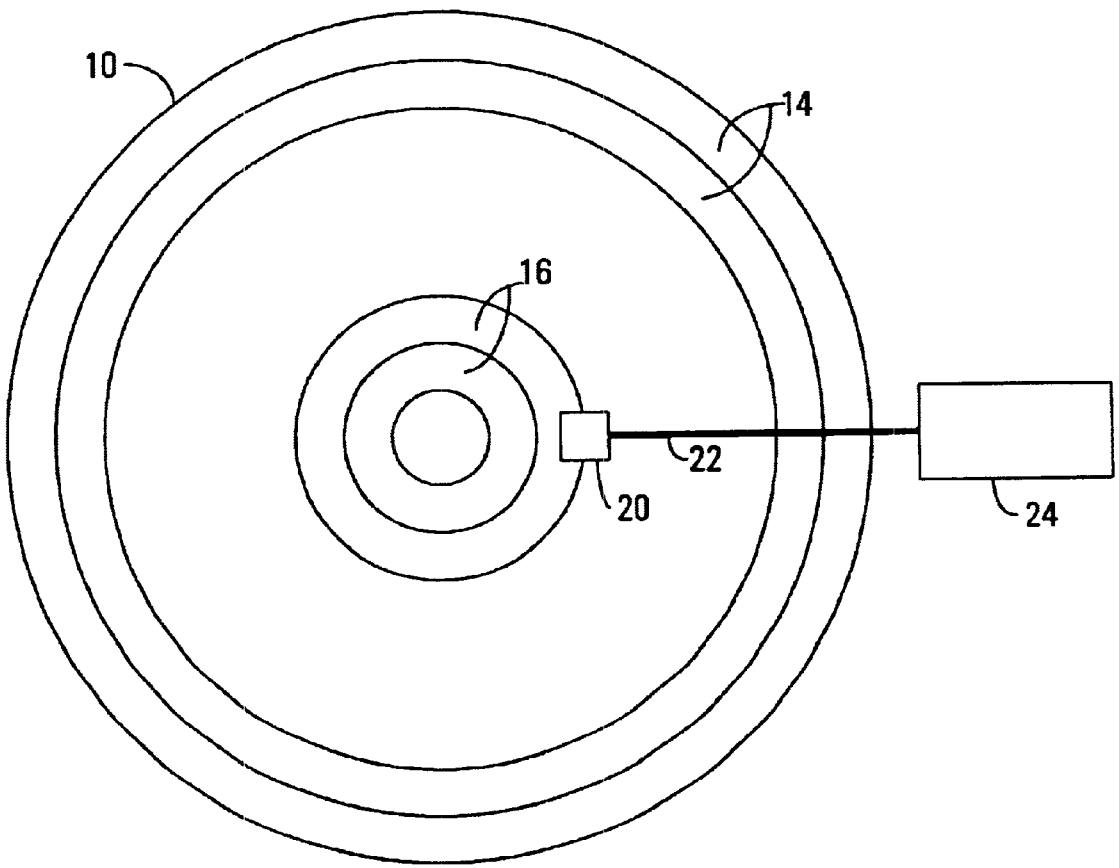
FIG. 1 illustrates a number of tracks having different radii from the center of a disk media in accordance with the present invention.

FIG. 1 illustrates a top view of a disk media 10 used in accordance with the present invention. The disk media 10, either magnetic or optical, is annular in shape and contains circular tracks, e.g., 16 and 14. The magnetic disk can be non-removable (e.g., a platter of a hard disk) or it can be removable (e.g., a floppy or cartridge). The disk media 10 is spun at a constant angular velocity and the bit density (e.g., bits per linear inch) stored on the surface of the disk media 10 is generally constant. In the disk mechanism, a read/write head 20 is positioned over the tracks for data access (read/write) operations. The head 20 is moved by an arm 22 which is coupled to an actuator 24. Given the above environment, data is accessed at higher rates at the outer tracks 14 when compared to the data access rate of the inner tracks 16. This is because the circumference of the outer tracks 14 is larger than the circumference of the inner tracks 16. Each disk rotation takes the same amount of time in a constant angular velocity drive, therefore, per unit time, more data can be accessed from the outer tracks 14 than from the inner tracks 16. More data can be accessed because, during data access operations, the head 20 passes over more media surface per unit time for the outer tracks 14 than for the inner tracks 16.

Figure 2A:
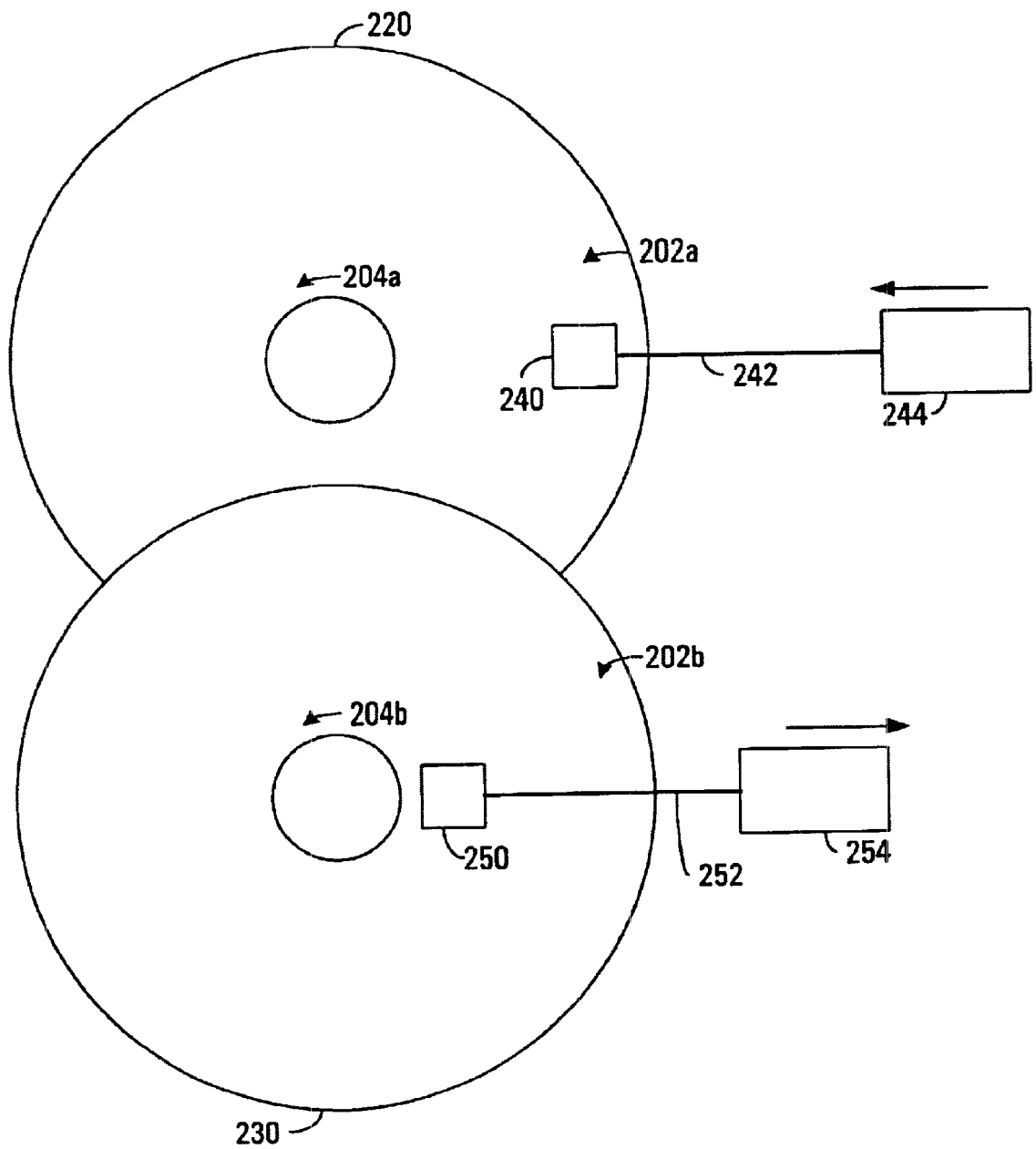
FIG. 2A is a diagram of on e embodiment of the present invention having dual disk heads with opposite position with respect to two disk platters and each head moving in opposite direction but synchronized in motion.

FIG. 2A illustrates one configuration 210 of the present invention dual head access mechanism. This embodiment utilizes two read/write heads 240 and 250 which interface with two respective disk media surfaces 220 and 230. Therefore, each read/write head ("head") 240 and 250 accesses different magnetic platter surfaces in the drive. The first head 240 accesses data in a conventional manner by starting at the outside track regions 202*a* of its platter surface 220 and traversing across the tracks toward the inner track regions 204*a*. Arm 242 and actuator 244 are used to position the first head 240. Head movement for the first head 240, during data access operations, is therefore from the outer tracks toward the inner tracks. Because the platters 220 and 230 rotate at a constant angular velocity, the outside track regions 202*a* are called high data rate tracks while the inside track regions 204*a* are called low data rate tracks, as described with respect to FIG. 1.

The second head 250 of FIG. 2A accesses data in the reverse direction, going in the opposite direction as the first head 240, by starting out at the inner track regions 204*b* of the platter surface 230 and traversing toward the external or high rate track regions 202*b*. Head movement for the second head 250, during data access operations, is therefore from the inner tracks toward the outer tracks. Again, because the platters 220 and 230 rotate at a constant angular velocity, the outside track regions 202*b* are called high data rate tracks while the inside track regions 204*b* are called low data rate tracks, as described with respect to FIG. 1. Arm 252 and actuator 254 are used to position the second head 250. The mapping of logical sectors on the media 220 and 230 is done such that it allows for the access operation to the media to be done simultaneously by the two heads 240 and 250, while the throughput data rate are combined by suitably interleaving the data on the two media surfaces.

As shown in FIG. 2A, the first head 240 and the second head 250 are shown in their initial positions. In these positions, the first head 240 is accessing data at a high data rate while the second head 250 is accessing data at a low data rate. It is appreciated that the first and second heads move in opposite directions with respect to each other and with respect to the their associated tracks, but the first and second heads move in synchronization with each other. Therefore, as one head moves, the other head moves in synchronization but in the reverse direction across its associated tracks. In the present invention, the data accessed from the first and second heads are combined together to provide a substantially constant and high data throughput, regardless of the heads' positions.

As the first head 240 traverses to relatively lower data rate tracks, the second head 250 simultaneously traverses to relatively higher data tracks, with the combination data rate of the two data rates remaining substantially constant and high. In this fashion, most, if not all, of the inner track regions 204*a*–204*b* can effectively be used for storing data thereon and the disk drive still maintains a high data throughput rate to support high data throughput rate applications, such as audio/video applications. Therefore, the mixing of high and low data throughput rates internal to the drive of the present invention results in a stable average throughput rate that is high enough to satisfy audio/video (AV) application requirements, while allowing for the maximum utilization of available magnetic media for data storage because the inner track regions 204*a*–204*b* are used to store data thereon in accordance with the present invention.

It is appreciated that while FIG. 2A illustrates the first and second heads accessing different platters, the present invention is well suited for implementations where the first and second head access different surfaces of the same disk platter. In this case, the first and second disk media represent a first and a second side of the same platter.

Figure 2B:
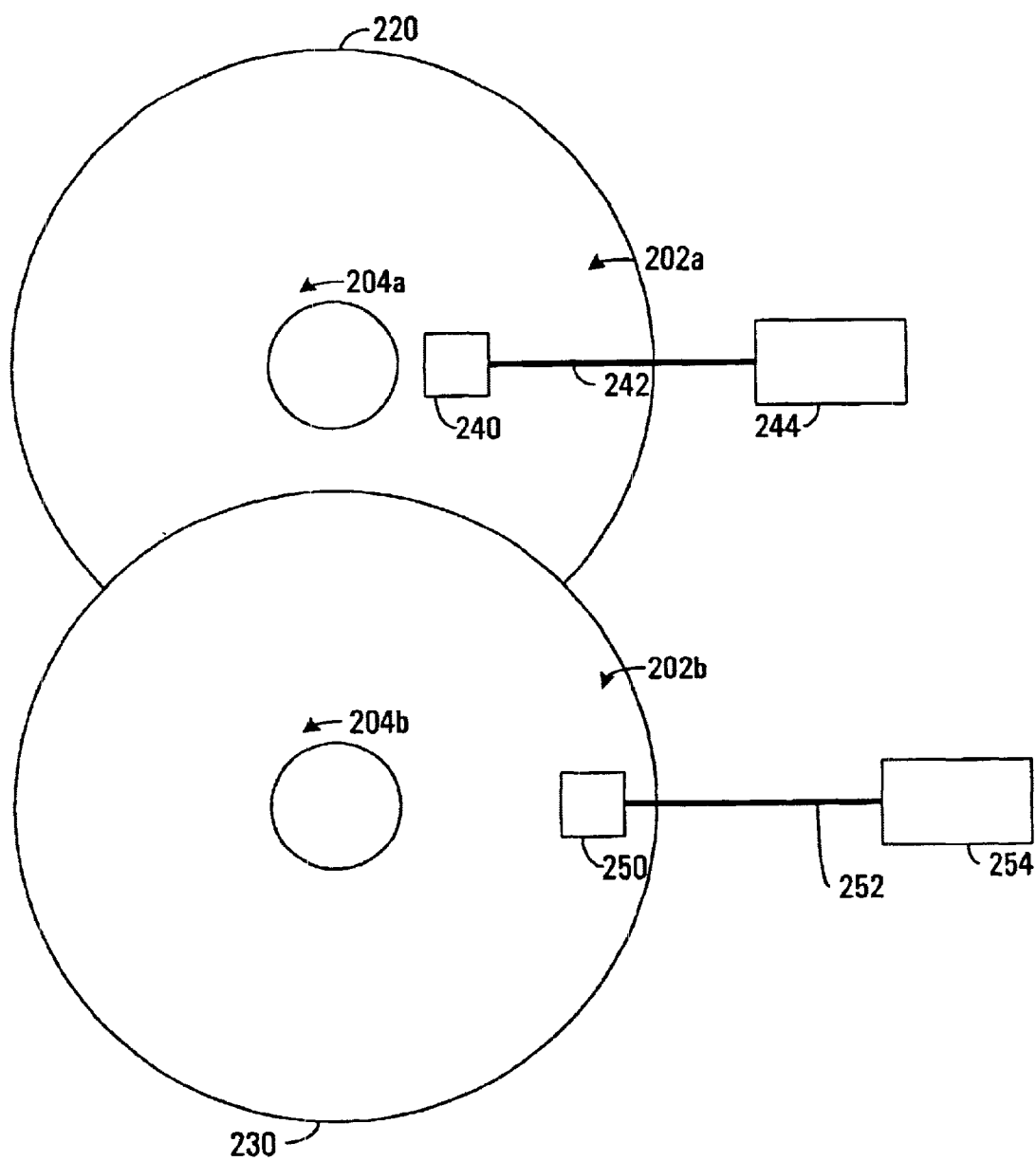
FIG. 2B is a diagram of the embodiment of the present invention of FIG. 2A with the dual disk heads in reverse position with respect to their positions in FIG. 2A.

FIG. 2B illustrates the configuration 210 of the present invention with the first head 240 and the second head 250 in the reverse positions to those shown in FIG. 2A. As shown in FIG. 2B, the first head 240 and the second head 250 are shown in their final positions. In these positions, the first head 240 is accessing data at a low data rate at the inner track regions 204*a* while the second head 250 is accessing data at a high data rate at the outer track regions 202*b*. In the present invention, the data accessed from the first and second heads are combined together to provide a substantially constant and high data throughput, regardless of the heads' positions. As the first head 240 traverses to relatively lower data rate tracks, the second head 250 simultaneously traverses to relatively higher data tracks, with the combination data rate of the two data rates remaining substantially constant and high.

Figure 2C:
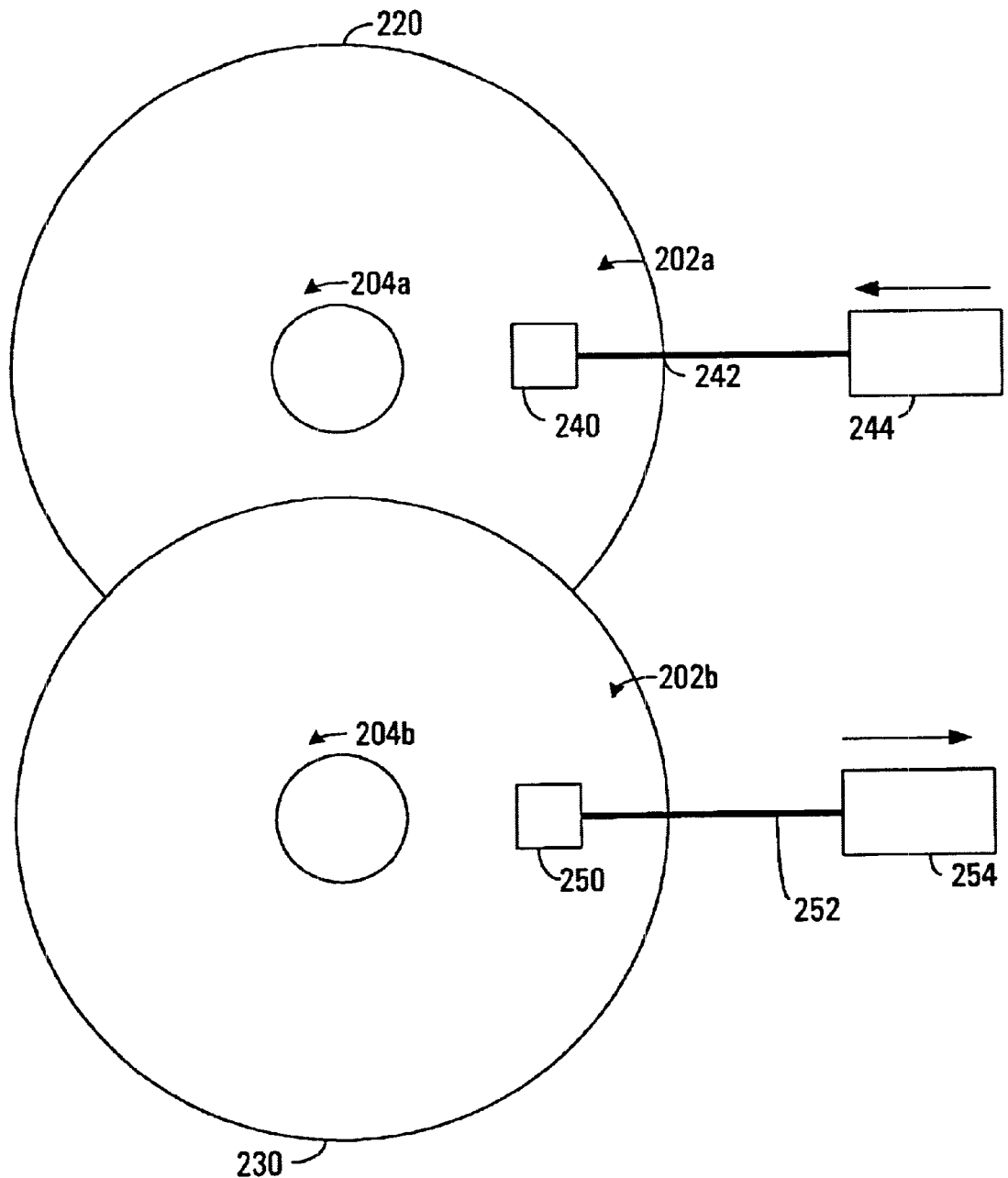
FIG. 2C is a diagram of the embodiment of the present invention of FIG. 2A with the dual disk heads in middle position.

FIG. 2C illustrates the configuration 210 of the present invention with the first head 240 and the second head 250 in middle positions to those shown in FIG. 2A. As shown in FIG. 2C, the first head 240 and the second head 250 are shown in roughly middle positions. In these positions, the first head 240 is accessing data at a high to medium data rate at its track regions while the second head 250 is accessing data at a low to medium data rate at its track regions. In the present invention, the data accessed from the first and second heads are combined together to provide a substantially constant and high data throughput, regardless of the heads' positions. As the first head 240 traverses to relatively lower data rate tracks, the second head 250 simultaneously traverses to relatively higher data tracks, with the combination data rate of the two data rates remaining substantially constant and high.

Table I below illustrates the data throughput rates for each head and the output combination data throughput in accordance with the present invention for the example configuration of FIG. 2A, FIG. 2B and FIG. 2C.

TABLE I

| First Head 240 Data Throughput | Second Head 250 Data Throughput | Combined Data Throughput |
|---|---|---|
| 4x | 2x | 6x |
| 2x | 4x | 6x |
| 3.2x | 2.8x | 6x |

Figure 2D:
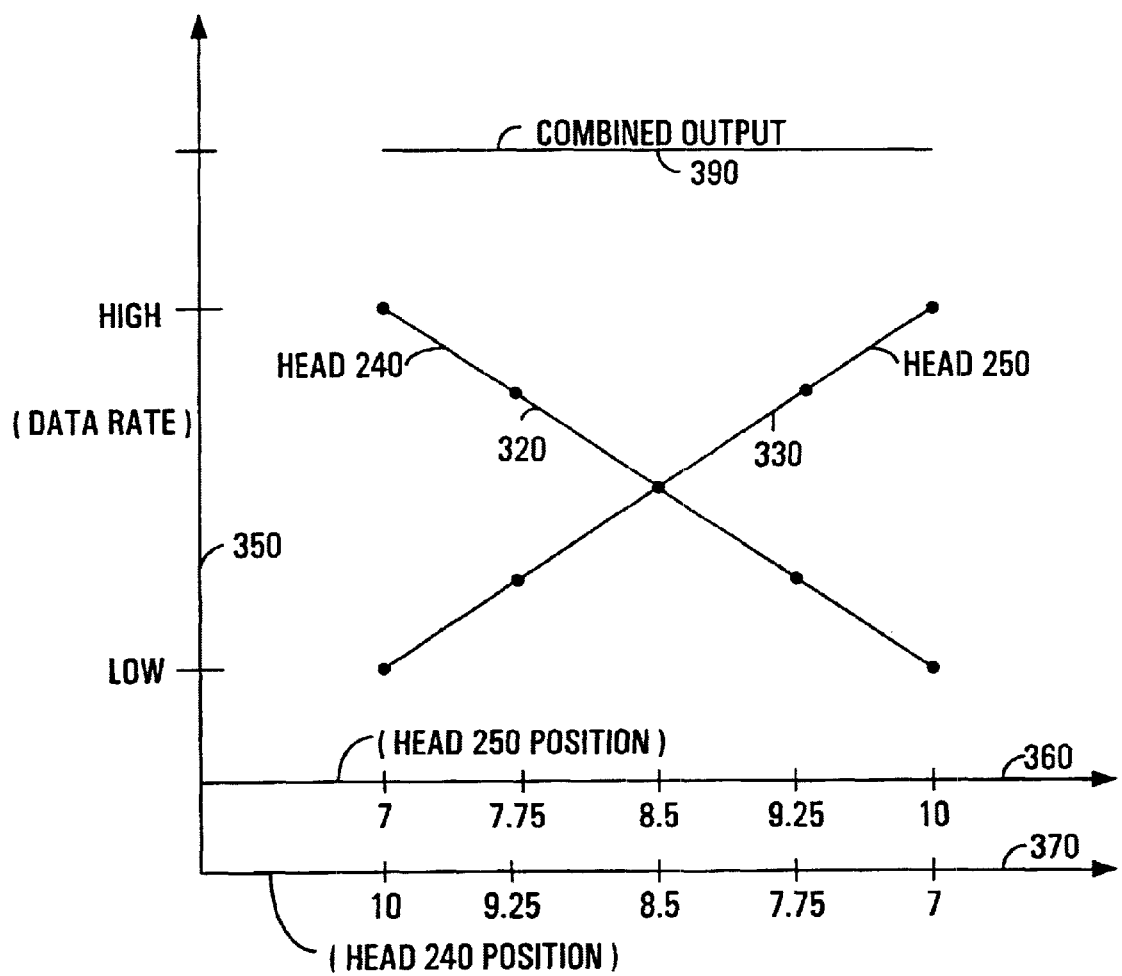
FIG. 2D is a graph illustrating exemplary data throughputs for the first head, the second head and their combination for an exemplary configuration in accordance with the present invention.

FIG. 2D is a graph illustrating exemplary data throughputs for the first head 240, the second head 250 and the combination for an exemplary configuration in accordance with the dual head design of the present invention. Exemplary data rate values are shown along the vertical axis 350. Head position for the first head 240 is shown along horizontal 370 while head position for the second head 250 is shown along the horizontal 360. As shown, the first head moves in opposite direction with respect to the second head but in synchronization with the second head. Exemplary positions of 7.0 to 10 are shown as example track radii only. The data throughput rate corresponding to the first head 240 is the graph shown as curve 320 which is exponential and varies as the square of the head's radius (e.g., track position or track radius). The data throughput rate corresponding to the second head 250 is the graph shown as curve 330 which is exponential and varies as the square of the head radius (e.g., track position).

As shown in FIG. 2D, curve 320 starts high (at the left) and as the first head 240 traverses toward the inner track regions, curve 320 drops in data throughput rate. Correspondingly, curve 330 starts low (at the left) and as the second head 250 traverses toward the outer track regions, curve 330 gains in data throughput rate. The curves 320 and 330 are not linear, but they are very close to linear and therefore their sum is roughly a sustained and high data throughput, as shown by curve 390. Curve 390 represents the total data throughput rate of the dual head disk embodiment of the present invention. In average, curve 390 represents a substantially constant and high data throughput rate suitable for supporting a number of well known high data throughput applications, such as audio/video (AV) applications.

Figure 3A:
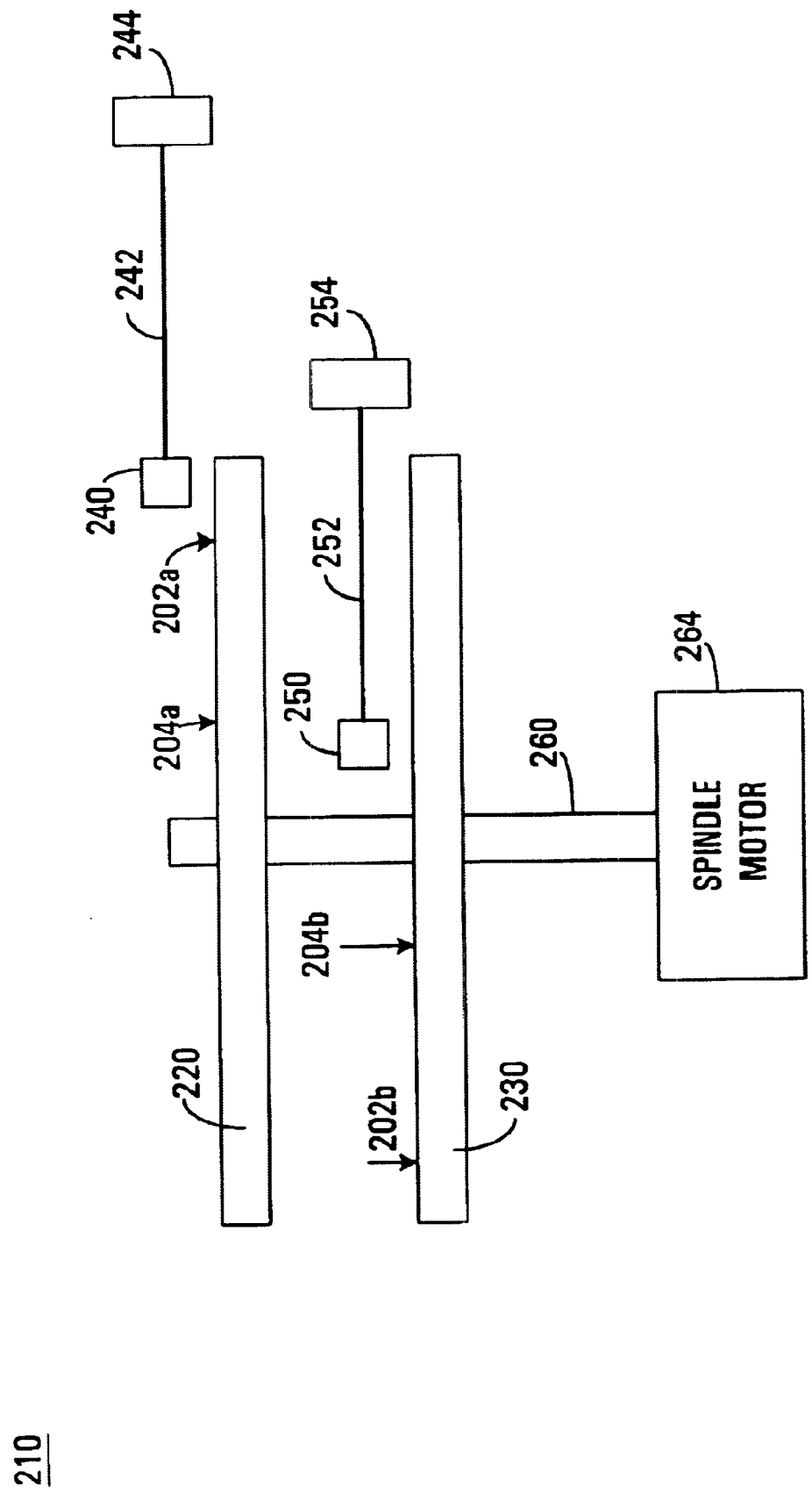
FIG. 3A is a side view of the embodiment of the present invention as shown in FIG. 2A.

FIG. 3A is a side view of the dual head embodiment of the present invention f or a magnetic hard drive implementation. A spindle motor 264 is mechanically coupled to an axis 260 which secures recording platters 220 and 230. In this embodiments, platters 220 and 230 are defined as first and second disk media. Spindle motor 254 rotates platters 220 and 230 at a constant angular velocity. Head 240 is shown coupled to arm 242 which is coupled to actuator 244. Head 250 is shown coupled to arm 252 which is coupled to actuator 254. Head 240 interfaces with the top surface of platter 220 while head 250 interfaces with the top surface of platter 230. Actuator 254 is separate from actuator 244. Any of a number of well known systems can be used as arms and actuators, and control logic for same, for moving heads 240 and 250. In one embodiment, actuator 244 is coupled to a well known magnetic voice coil system for controlled movement. It is appreciated that in an alternative embodiment of the present invention, head 250 can interface with the bottom surface of platter 220. In this alternative embodiment, the top and bottom surfaces of the same platter are defined as first and second disk media, as described above.

FIG. 3B illustrates a dual head set embodiment 310 of the present invention. In this embodiment, sets of heads are controlled uniformly to increase data throughput. In the implementation shown in FIG. 3B, each head set contains two heads, however, this is an exemplary configuration only and a head set can include any number of heads (e.g., more than two) within the scope of the present invention. In this embodiment 310, a first head set contains heads 240a and 240b. These heads 240a–240b are coupled, respectively, to arms 242a and 242b which are both coupled to a common actuator 244'. In this embodiment 310, a second head set contains heads 250a and 250b. These heads 250a–250b are coupled, respectively, to arms 252a and 252b which are both coupled to a common actuator 254'. Common actuators 244' and 254' can be controlled using a number of well known techniques.

Heads 240a and 250a move, respectively, in the same manner as described with respect to heads 240 and 250. All other heads in the first head set track the movement of head 240a. All other heads in the second head set track the movement of head 250a. In the configuration of FIG. 3B, the heads of the first head set interface with the top surface of platters 220 and 230 and the heads of the second head set interface with the bottom surface of platters 220 and 230. In an alternative configuration, the heads of the first and second set could be interleaved with respect to the surfaces of the platters. For instance, in this alternative embodiment, heads 240a and 240b would interface with the top and bottom surfaces, respectively, of platter 220 while heads 250a and 250b would interface with the top and bottom surfaces, respectively, of platter 230.

Figure 4A:
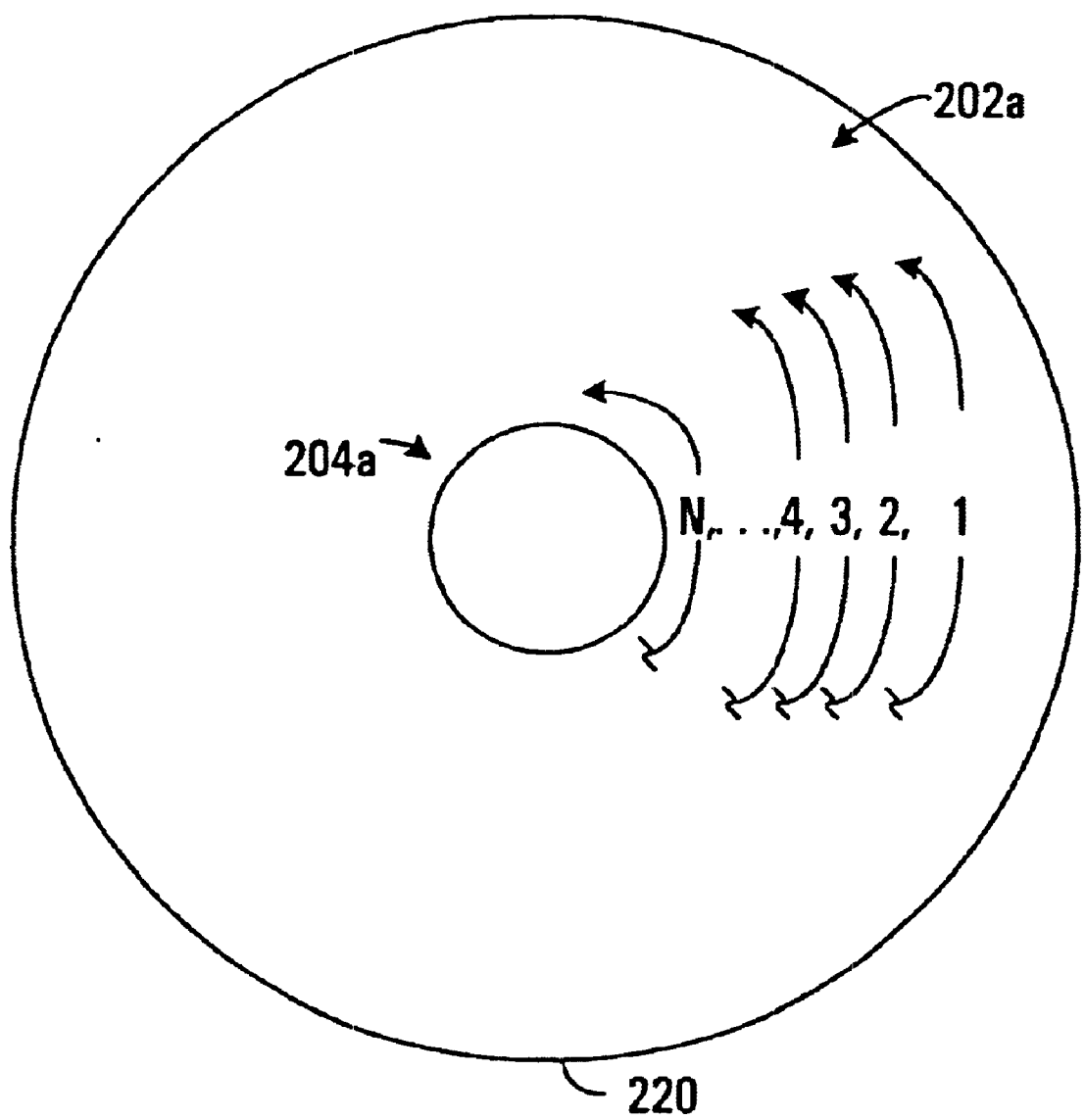
FIG. 4A and FIG. 4B illustrate one track numbering scheme used in an embodiment of the present invention for the tracks on a first and a second disk media.
Figure 4B:
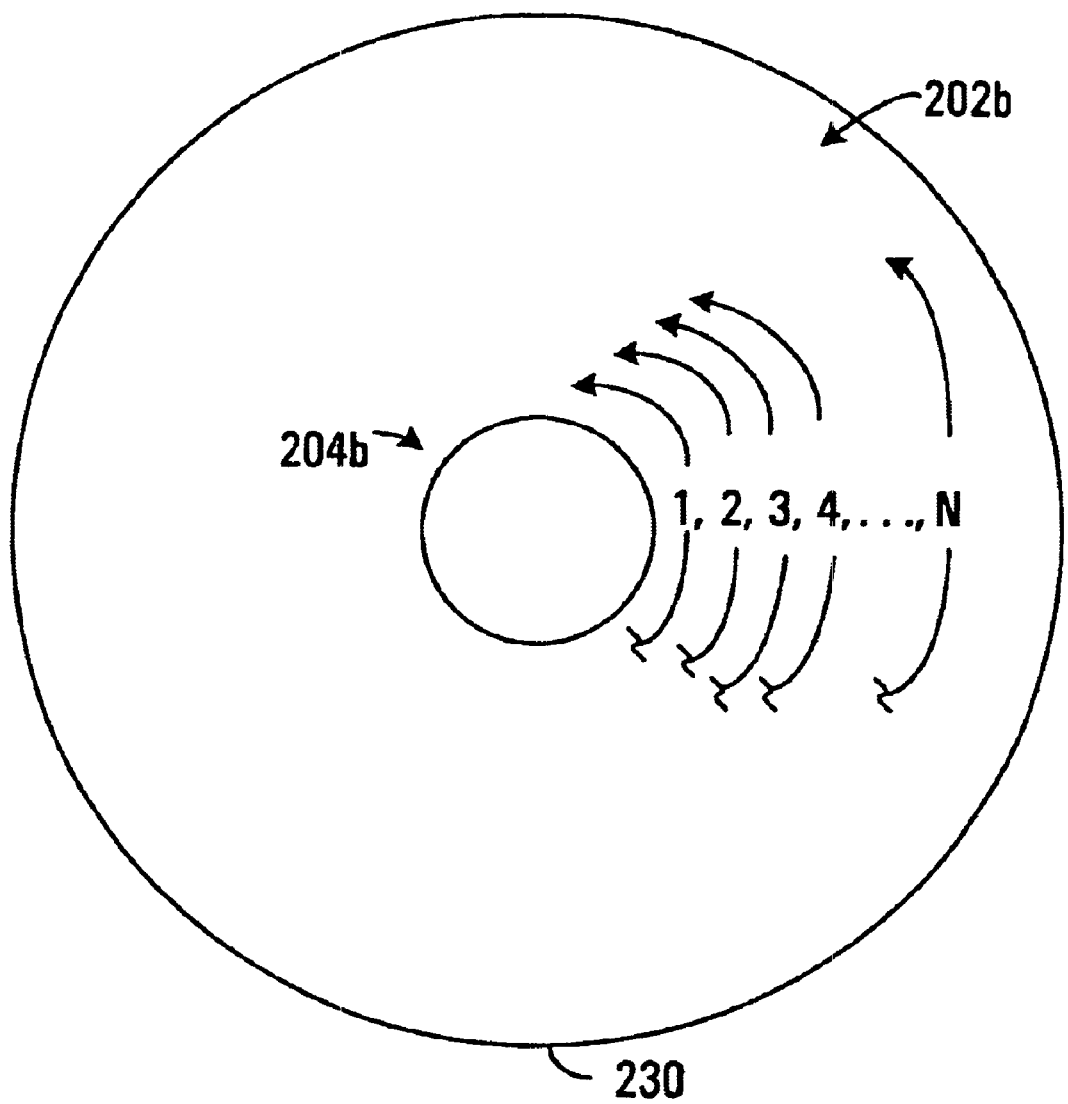

FIG. 4A and FIG. 4B illustrate exemplary track assignments for the dual head embodiment 210 and the dual head set embodiment 310 of the present invention. In these exemplary track assignments, the top surface of platter 220 is accessed by the first head and therefore its tracks are numbered from 1 to N starting from the outer track regions 202a and ending in the inner track regions 204a as shown in FIG. 4A. The tracks are numbered consecutively in these examples. Multiple sectors can reside within a track. The sectors are numbered in the order of and according to their track number with outer track sectors numbered lower and inner track sectors numbered higher. In one implementation, a sector contains a predefined number of bytes each, e.g., 512 bytes, for instance.

With respect to FIG. 4B, the top surface of platter 230 is accessed by the second head and therefore its tracks are numbered from N to 1 starting from the outer track regions 202a ("N") and ending in the inner track regions 204a ("1") as shown in FIG. 4B. Multiple sectors can reside within a track. The sectors are numbered in the order of and according to their track number with outer track sectors numbered higher and inner track sectors numbered lower. In one implementation, a sector contains a predefined number of bytes each, e.g., 512 bytes, for instance. In operation, data is interleaved on the tracks between the disk medias 220 and 230.

Figure 5A:
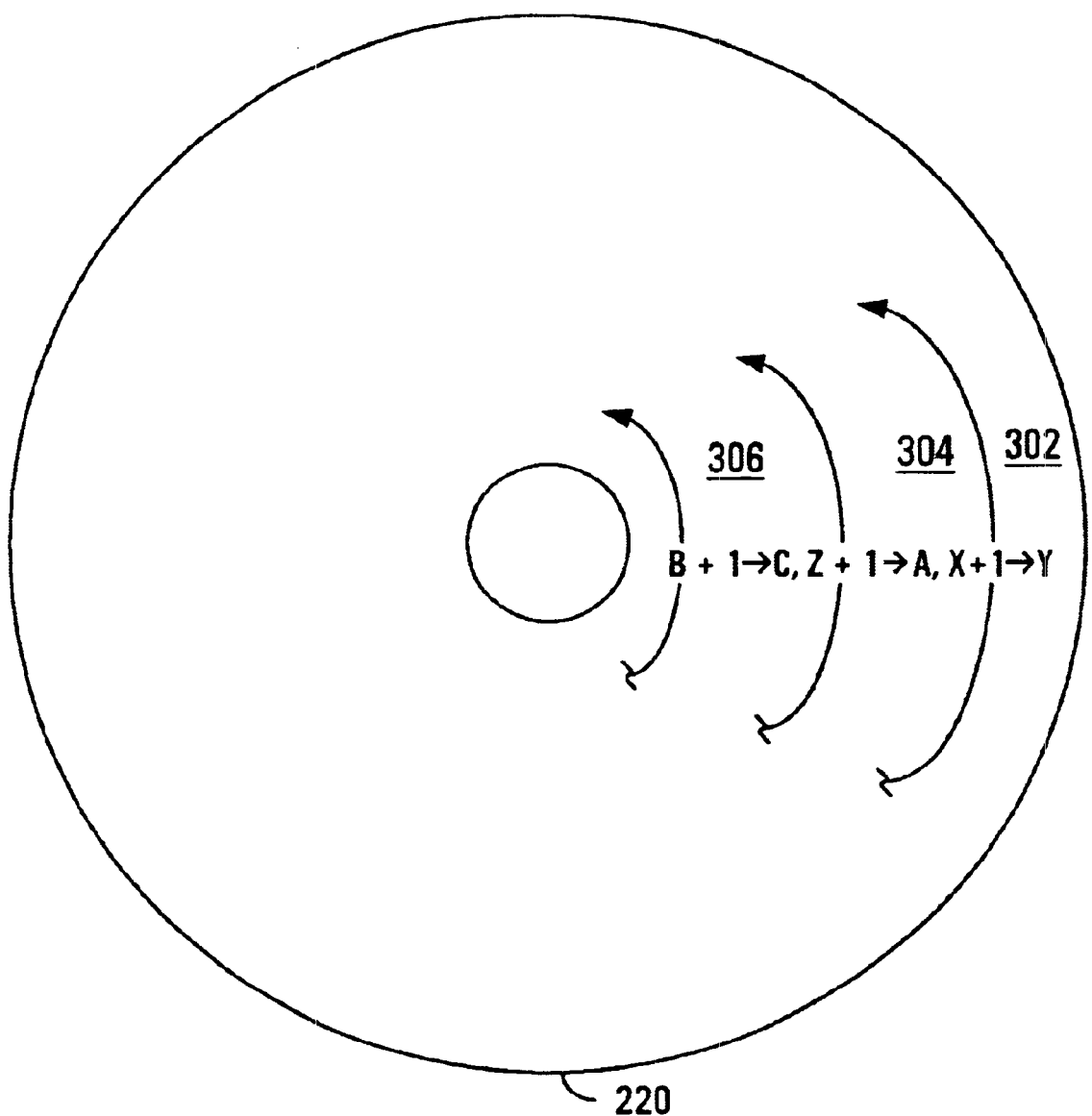
FIG. 5A and FIG. 5B illustrate a track interleaved numbering scheme used in an embodiment of the present invention for the tracks on a first and a second disk media.
Figure 5B:
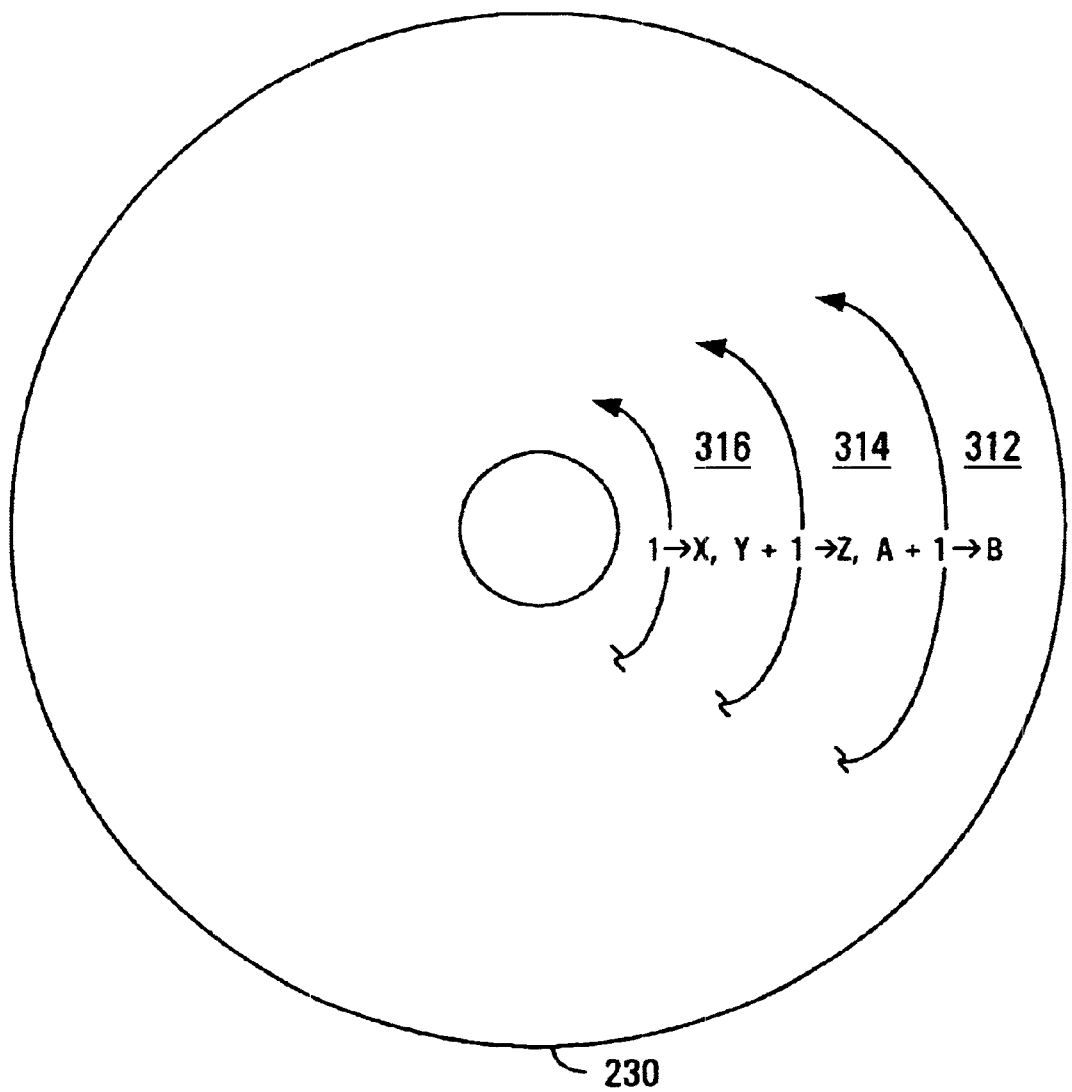

FIG. 5A and FIG. 5B illustrate that within the present invention, track assignments for the disk media can be ordered differently based on the data rates of the track positions and interleaved across the first and second disk media. Therefore, FIG. 5A and FIG. 5B illustrate track number interleaving. As shown, in this example, tracks 1 through track x are located at the inner region 316 of the second disk media 230. When the second head 250 is within this region 316, the first head 240 is within the outer region 302 of the first disk media 220 and therefore these tracks are numbered (x+1) to y. Moreover, tracks (y+1) through track z are located at the middle region 314 of the second disk media 230. When the second head 250 is within this region 314, the first head 240 is within the middle track region 304 of the first disk media 220 and therefore these tracks are numbered track (z+1) to track a. Lastly, tracks (a+1) through track b are located at the outer region 312 of the second disk media 230. When the second head 250 is within this region 312, the first head 240 is within the inner track region 306 of the first disk media 220 and therefore these tracks are numbered track (b+1) to track c.

It is appreciated that the three track groupings shown per disk media are exemplary only and that more or fewer track groupings can be used per disk media. Also, the actual number of tracks per grouping can vary depending on the average radius of the tracks of the grouping.

It is also appreciated that the within the embodiments of the present invention, whether or not the track numbers are ordered consecutively or interleaved, as described above, digital data is still accessed in an interleaved fashion between the first and second heads (and as between the first and second head sets). Because the data rates between the first and second heads are not always constant, the amount of data interleaved between the first and second heads varies depending on the expected track position of the heads when the data is to be written. For instance, when the first head is located on the outer track regions and the second head is therefore located on the inner track regions, the first head can have a data rate that is twice the second head. In this case, the present invention will supply twice the amount of data to the first head as to the second head, per unit time. In this fashion, the maximum combined data rate can be maintained and no head is waiting for the other head to complete.

Alternatively, when the first head is located on the inner track regions and the second head is therefore located on the outer track regions, the first head can have a data rate that is half the second head. In this case, the present invention will supply twice the amount of data to the second head as to the first head, per unit time. In this fashion, the maximum combined data rate is again maintained and no head is waiting for the other head to complete. When the first head is located on the middle track regions and the second head is therefore located on the middle track regions, the first head can have a data rate that is roughly equal to the second head. In this case, the present invention will supply equal amounts of data to the second head and to the first head per unit time.

As shown by the above examples, the data rate of a particular head, and therefore the amount of data supplied to that head per unit time, is based on the expected track position of the head during data access operations. The present invention therefore routes data to the heads (during writing operations) and receives data from the heads (during reading operations) in amounts that depend on their respective track positions during the data accessing operations. Because the track position of the first head is dependent on the track position of the second head, and vice-versa, the present invention can effectively deal with head track position ratios between the first and second heads. These track position ratios can be translated into data rate ratios which can then be used to determine the data throughput amounts for each head depending on their corresponding track position ratios. As described further below, the correspondence between track position ratios and data rate ratios can be maintained by a look-up table stored in a memory unit.

Figure 6A:
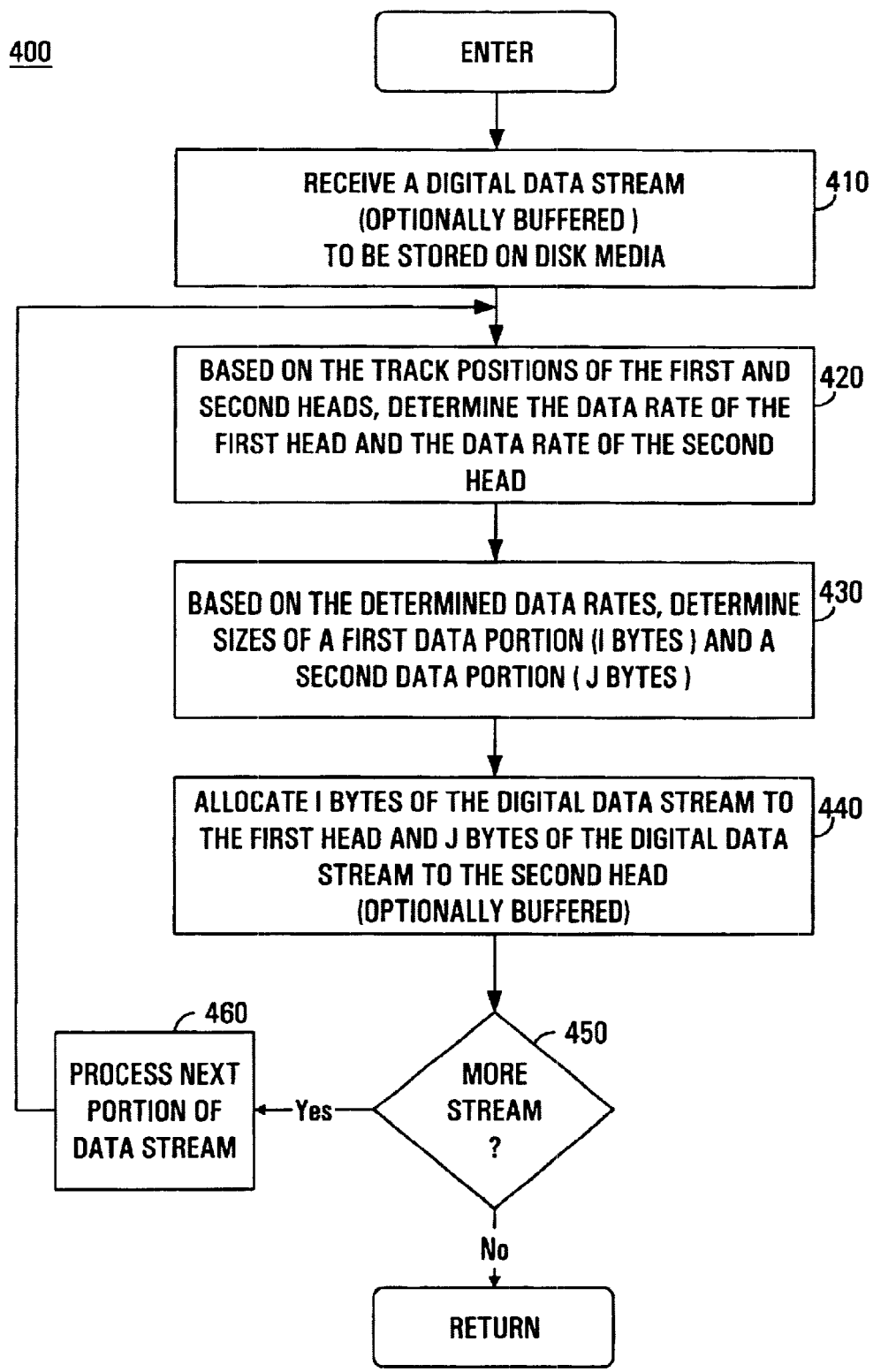
FIG. 6A illustrates steps used in one embodiment of the present invention for writing a digital data stream to the dual head disk mechanism of the present invention.

FIG. 6A illustrates steps used in a process 400 of the present invention for performing write operations using the dual head disk drive embodiments of the present invention. At step 410, a request is received to store a digital data stream that corresponds to a particular file. In one embodiment, the digital data stream represents AV content to be stored on disk media. At step 420, the present invention determines which tracks are available for storage of the digital data stream. A number of well known techniques can be used to determine which tracks of a disk media are available for receiving new digital information. The available tracks that are determined at step 420 reside on the first 220 and second 230 disk media.

It is appreciated that once the available tracks are determined at step 420, the present invention then determines the data rate of the first head and the data rate of the second head for those determined tracks. This information can readily be determined because the track number indicates the radius position along the disk media and the radius position can be translated into a data rate for the corresponding head. Step 420 then returns a data rate ratio between the data throughput rate of the first head 240 over the data throughput rate of the second head 250. In one embodiment, a look-up table is stored in memory and is referenced to produce the data rate ratio. The look-up table corresponds respective track position ratios (e.g., the ratio of the track position for the first head over the track position for the second head) with their corresponding data rate ratios. The data for the look-up table can be determined empirically by performing disk calibration at the factory, or it can be dynamically determined and updated as the disk drive is being used. The important feature of the memory is that it will produce a data throughput value for any head track position or range of positions. These values can then be translated into data rate ratios.

At step 430 of FIG. 6A, the present invention then determines sizes of data portions to forward to the first head and to forward to the second head. At step 430, the present invention utilizes the data throughput ratios obtained in step 420 to determine the proper data portion sizes for a given unit of time. The ratio of the sizes of the data portions corresponds to the data rate ratio obtained from step 420. The data portion forwarded to the first head 240 is I bytes in size and the data portion forwarded to the second head 250 is J bytes in size. Therefore, I/J represents the data ratio determined at step 420. Using these data portion sizes and the corresponding track positions of the first and second heads, a constant and high data throughput rate can be maintained (as shown in FIG. 2D) by the disk drive of the present invention when writing the I+J bytes.

At step 440 of FIG. 6A, the next I bytes of the digital data stream are forwarded to the first head 240 for storage thereby onto the first disk media 220. Simultaneously with the forwarding of the I bytes, the next J bytes of the digital data stream are forwarded to the second head 250 for storage thereby onto the second disk media 230 at the determined tracks. It is appreciated that the digital data stream can be buffered so that simultaneous forwarding of data to the first and second heads can be readily accomplished. At step 440, the digital data can be directly supplied to the first and second heads or can optionally be buffered into queues, one queue for each head. The allocated data is then stored at the tracks determined at step 420 when the data reaches the output point of the queue.

At step 450, the present checks if more of the digital data stream remains to be stored. If so, then at step 460 a next portion of the digital data stream is to be processed and step 420 is entered again. At step 450, if the entire digital data stream has been processed, then the write process 400 terminates.

Figure 6B:
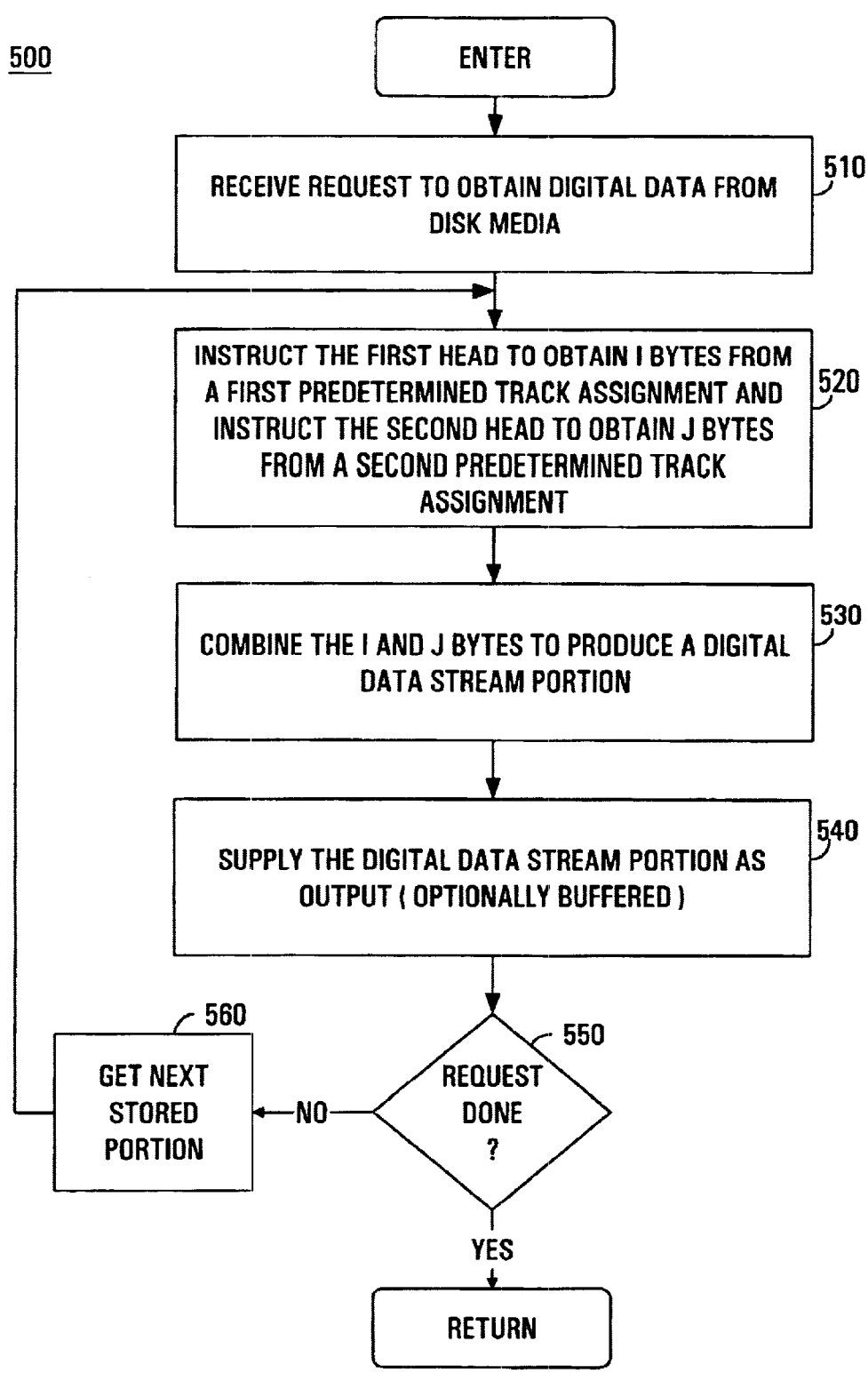
FIG. 6B illustrates steps used in one embodiment of the present invention for reading a digital data stream from the dual head disk mechanism of the present invention.

FIG. 6B illustrates steps of process 500 for retrieving a stored digital data stream from the dual head disk drive embodiment of the present invention. At step 510, the present invention receives a request to obtain data stored on the disk media. At step 510, the present invention is informed of the tracks on which the data is stored. The tracks correspond to tracks on the first 220 and second 230 disk media. At step 520, the present invention instructs the disk servo mechanisms for the first head to obtain I bytes from the given tracks of the first disk media. The present invention also simultaneously instructs the disk servo mechanisms for the second head to obtain J bytes from the given tracks of the second disk media. Using these data portion sizes and the corresponding track positions of the first and second heads, a constant and high data throughput rate can be maintained (as shown in FIG. 2D) by the disk drive of the present invention for obtaining the I+J bytes of the digital data stream.

At step 530 of FIG. 6B, the present invention combines the I and J bytes to produce a segment of the digital data stream requested. At step 540, the combined digital data stream is supplied as an output for use by another electronic device, e.g., by a host computer system. The output can optionally be buffered. At step 550, a check is made if the entire data stream was processed yet. If not, then at step 560 the present invention obtains track information for the next stored portion of the digital data stream and step 520 is entered again. At step 550, if the entire digital data stream was retrieved already, then process 500 terminates.

Figure 7:
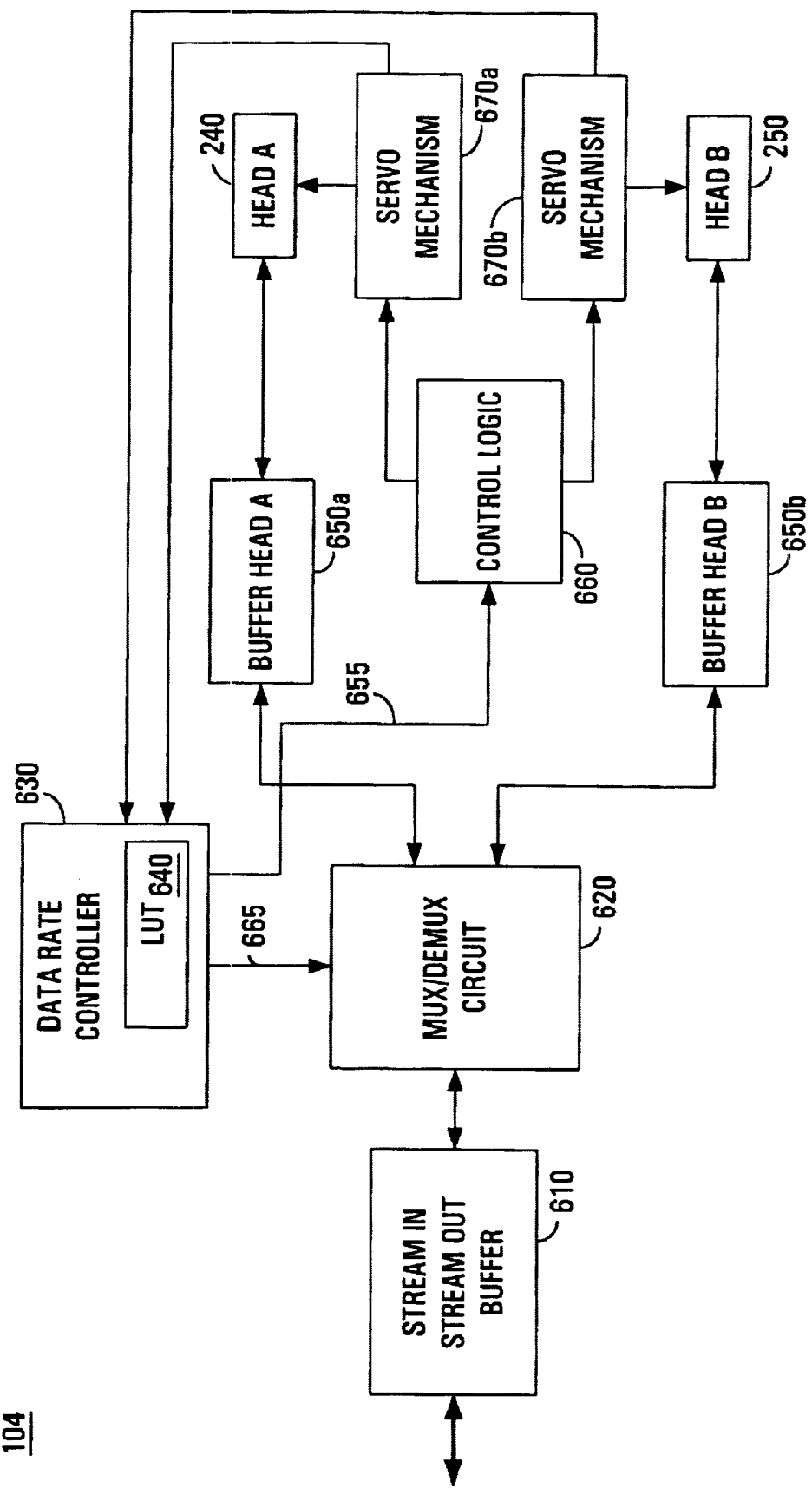
FIG. 7 illustrates a block diagram of components of the dual head drive mechanism of the present invention for a disk drive device.

FIG. 7 illustrates a block diagram of components of a dual head disk drive 104 implemented in accordance with the present invention. Disk drive 104 contains a buffer 610 for receiving an input digital data stream to be stored onto disk media and for supplying an output digital data stream that was retrieved from disk media. The buffer 610 is coupled to supply data to a multiplexer/demultiplexer (mux/demux) circuit 620 and to receive data from the mux/demux circuit 620. The mux/demux circuit 620 is responsible for routing data portions of the digital data stream to the first head 240 and to the second head 250 during write operations to maintain a substantially uniform and high data throughput rate. The mux/demux circuit 620 is also responsible for combining data portions retrieved from the first head 240 and from the second head 250 to form a segment of the digital data stream during read operations to maintain a substantially uniform and high data throughput rate.

The mux/demux circuit 620 is coupled to supply data to and receive data from a first head buffer ("first buffer") 650*a*. The mux/demux circuit 620 is also coupled to supply data to and receive data from a second head buffer ("second buffer") 650*b*. The first buffer 650*a* supplies data to the first head 240 during write operations and also receives data from the first head 240 during read operations. The second buffer 650*b* supplies data to the second head 250 during write operations and also receives data from the second head 250 during read operations. A first servo mechanism 670*a* is coupled to the actuator 244 of the first head 240 and functions to position the first head 240 during read and write operations. A second servo mechanism 670*b* is coupled to the actuator 254 of the second head 250 and functions to position the second head 250 during read and write operations. Any of a number of well known devices can be used as the servo mechanisms 670*a* and 670*b*. Head position control logic 660 is coupled to control the servo mechanisms 670*a* and 670*b* and is responsive to track numbers received over line 655.

Each servo mechanism 670*a* and 670*b* of FIG. 7 supplies the current head position back to a data rate controller circuit 630 for use in read/write operations and for calibration of a look-up table information. Data rate controller circuit 630 determines available tracks of the disk media for receiving digital data stream information during a write operation and also controls the control logic 660 when retrieving stored information from the disk media. Data rate controller circuit 630 also contains a memory unit 640 which has a look-up table (LUT) stored thereon. The LUT correlates track position ratios with data rate ratios as described with respect to FIG. 6A and FIG. 6B. Data rate ratio information is used to control the mux/demux circuit 620 using control line 665.

During a write operation, data rate controller 630 determines the available tracks for storage of new data of buffer 610. This track position information (of the first and second heads) is translated into a track position ratio which is then input as an index to the memory stored LUT 640. The LUT 640 then supplies a corresponding data rate ratio over line 665 which instructs the mux/demux circuit to route I bytes of the input data stream to buffer 650*a* and J bytes of the input data stream to buffer 650*b*. By using the LUT 640 to determine values of J and I based on the track position, the present invention is able to sustain a maximum throughput data rate regardless of the track position ratio of the first and second heads. The actual track numbers for storing the I and J bytes are simultaneously forwarded to the control logic 660 ("firmware") via line 655. The control logic 660 controls servo mechanisms 670*a*–670*b* which properly position heads 240 and 250, respectively, to store the bytes with a substantially uniform and high data throughput rate. This process is repeated for each segment of the input data stream as described with respect to FIG. 6A.

The information in the LUT 640 of FIG. 7 can be obtained empirically through device calibration at the factory during the manufacturing process. It can also be obtained dynamically by the drive 104 and re-calibrated periodically. By providing feedback of the heads' track positions from the servo mechanisms 670*a*–670*b* to the data rate controller 630, the drive 104 can scan across all tracks and record the corresponding data rate throughput at each track. From this information, the track position ratios and their corresponding data rate ratios can be determined and the contents of the LUT 640 can be updated periodically with this information. In an alternative embodiment, the LUT 640 can reference track ranges to data rate ratios where the input index is a track number and the output is a data rate ratio.

During read operations, the data rate controller 630 contains the tracks on which the desired data resides. The data rate controller 630 supplies this track information to the control logic 660 which instructs the servo mechanisms to position the first and second heads to obtain the data. The retrieved data is stored in buffers 650*a* and 650*b*. The data rate controller 630 also supplies data rate ratio information to mux/demux circuit 620 which uses this information to obtain I bytes from buffer 650*a* and J bytes from buffer 650*b* during the read operation. By using the LUT 640 to determine values of J and I based on the track position, the present invention is able to sustain a maximum throughput data rate regardless of the track position ratio of the first and second heads. The mux/demux circuit 620 then combines the received data and outputs a segment of the digital data stream to buffer 610. This process is repeated for each segment of the input data stream as described with respect to FIG. 6B.

It is appreciated that buffers 650*a* and 650*b* are optional and function to group the associated data and perform data distribution so that precise synchronization between the head positions and data availability is not always required. With the buffers, data streaming can generally continue uninterrupted even in the face of bad tracks that require remapping operations, etc. It is also appreciated that the average maximum throughput data rate is generally set to be slightly higher than required by the application program requesting the data or supplying the data. In cases when the average maximum throughput is faster, the additional data is buffered in buffer 610 and the drive may be forced to wait for the application program to catch up with the data supply. In cases when the data rate decreases temporarily, e.g., as a result of bad sector remapping, etc., the buffer contents are then used to ensure that an uninterrupted supply of data is available. The high sustained data throughput and buffering features make the present invention particularly useful for supplying AV data to AV application programs.

Computer System 112 of the Present Invention

Figure 8:
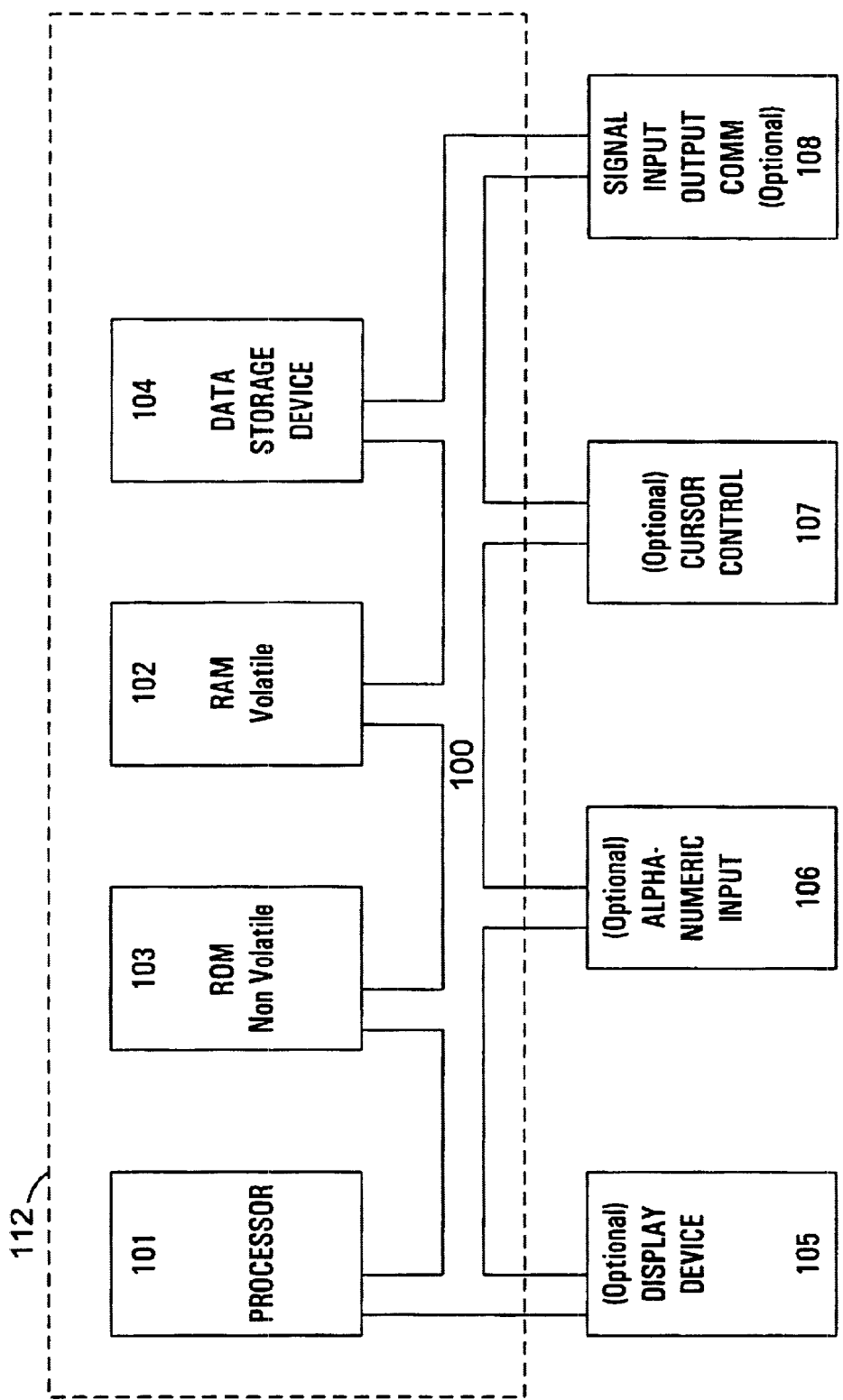
FIG. 8 is a block diagram of a computer system employing the dual head mechanism of the present invention.

The novel dual head disk drive device of the present invention can be implemented within a computer system 112 as shown in FIG. 8. The computer system 112 acts as a platform for application programs which supply data to the disk drive 104 and/or request data from the disk drive 104. The computer system 112 can be integrated within a portable electronic device or system, e.g., a personal digital assistant, a portable computer system (e.g., a laptop, a palm sized device), or a portable consumer based electronic device. Although a variety of different computer systems can be used with the present invention, an exemplary general purpose computer system 112 is shown in FIG. 8 having the dual head disk drive of the present invention as storage device 104.

In general, computer system 112 of FIG. 8 includes an address/data bus 100 for communicating information, a central processor 101 coupled with the bus for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Computer system 1 12 also includes the data storage device 104 ("dual head disk subsystem") coupled with the bus 100 for storing information and instructions and a display device 105 coupled to the bus 100 for displaying information to the computer user. System 112 can also be referred to as an embedded system.

Also included in computer system 112 of FIG. 8 is an optional alphanumeric input device 106 including alphanumeric and function keys coupled to the bus 100 for communicating information and command selections to the central processor 101. System 112 also includes an optional cursor control or directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. Computer system 112 can also include an optional signal generating device 108 coupled to the bus 100 for interfacing with other networked computer systems. The display device 105 utilized with the computer system 112 is optional and may be a liquid crystal device, cathode ray tube (CRT), light emitting diode (LED), field emission device (FED, also called flat panel CRT) or other display device suitable for creating graphic images and alphanumeric characters recognizable to the user.

The preferred embodiment of the present invention, a dual head disk accessing method and device for uniform high data throughput and increased storage capacity, is thus described. While the present invention has been described in particular embodiments, it should be appreciated that the present invention should not be construed as limited by such embodiments, but rather construed according to the below claims.

What is claimed is:

1. A digital storage device comprising:
a first disk media comprising a single storage area;
a second disk media comprising a single storage area;
a first head for writing digital data on a plurality of tracks of said first disk media, said first head moving across said single storage area of said first disk media in a first direction;
a second head for writing digital data on a plurality of tracks of said second disk media, said second head moving across said single storage area of said second disk media in a second direction opposite to said first direction; and
a multiplexer circuit for receiving a digital data stream and for supplying first portions of said digital data stream to said first head and second portions of said digital data stream to said second head, wherein respective size ratios of respective first and second portions are based on corresponding track position ratios of said first and second heads.

2. The digital storage device as described in claim 1 wherein said first head and said second head write digital data with a substantially constant combined data throughput rate as a result of said respective size ratios.

3. The digital storage device as described in claim 2 wherein said first direction of said first head is from an outer one of said plurality of tracks to an inner one of said plurality of tracks of said first disk media and wherein said second direction of said second head is from an inner one of said plurality of tracks to an outer one of said plurality of tracks of said second disk media.

4. The digital storage device as described in claim 2 further comprising a memory unit having stored therein a look up table and wherein said look-up table corresponds said respective size ratios to said associated track position ratios and wherein an output of said memory unit controls said multiplexer circuit.

5. The digital storage device as described in claim 2 further comprising a mechanism for spinning said first and second disk media at a constant angular velocity.

6. The digital storage device as described in claim 2 wherein said first disk media and said second disk media are magnetic disk platters.

7. The digital storage device as described in claim 2 wherein said first disk media and said second disk media are optical disks.

8. The digital storage device as described in claim 2 wherein said digital data stream represents audio/video (AV) information.

9. A digital storage device comprising:
a first disk media comprising a first surface and a second surface, said first surface comprising a single storage area and said second surface comprising a single storage area;
a second disk media comprising a first surface and a second surface, said first surface comprising a single storage area and said second surface comprising a single storage area;
a first head coupled to a first actuator and for writing digital data on a plurality of tracks of said first disk media, said first head moving across said single storage area of said first surface of said first disk media in a direction from an outer one of said plurality of tracks to an inner one of said plurality of tracks;
a second head coupled to a second actuator and for writing digital data on a plurality of tracks of said first disk media, said second head moving across said single storage area of said second surface of said first disk media in a direction from an inner one of said plurality of tracks to an outer one of said plurality of track;
a third head coupled to said first actuator and for writing digital data on a plurality of tracks of said second disk media, said third head moving across said single storage area of said first surface of said second disk media in a direction from an outer one of said plurality of tracks to an inner one of said plurality of tracks;
a fourth head coupled to said second actuator and for writing digital data on a plurality of tracks of said second disk media, said fourth head moving across said single storage area of said second surface of said second disk media in a direction from an inner one of said plurality of tracks to an outer one of said plurality of tracks; and a multiplexer circuit for receiving a digital data stream and for supplying first portions of said digital data stream to said first and third heads and second portions of said digital data stream to said second and fourth heads, wherein respective size ratios of respective first and second portions are based on corresponding track position ratios of said first and second heads.

10. The digital storage device as described in claim 9 wherein said first, second, third and forth heads write digital data with a substantially constant combined data throughput rate as a result of said respective size ratios.

11. The digital storage device as described in claim 10 further comprising a memory unit having stored therein a look up table wherein said look-up table corresponds said respective size ratios to said associated track position ratios and wherein an output of said memory unit controls said multiplexer circuit.

12. The digital storage device as described in claim 10 further comprising a mechanism for spinning said first and second disk media at a constant angular velocity.

13. The digital storage device as described in claim 10 wherein said first disk media and said second disk media are magnetic disk platters.

14. A digital storage device comprising:
a first disk media comprising a first surface and a second surface, said first surface comprising a single storage area and said second surface comprising a single storage area;
a second disk media comprising a first surface and a second surface, said first surface comprising a single storage area and said second surface comprising a single storage area;
a first head coupled to a first actuator and for reading digital data off of a plurality of tracks of said first disk media, said first head moving across said single storage area of said first surface of said first disk media in a direction from an outer one of said plurality of tracks to an inner one of said plurality of tracks;
a second head coupled to a second actuator and for reading digital data off of a plurality of tracks of said first disk media, said second head moving across said single storage area of said second surface of said first disk media in a direction from an inner one of said plurality of tracks to an outer one of said plurality of tracks;
a third head coupled to said first actuator and for reading digital data off of a plurality of tracks of said second disk media, said third head moving across said single storage area of said first surface of said second disk media in a direction from an outer one of said plurality of tracks to an inner one of said plurality of tracks;

a fourth head coupled to said second actuator and for reading digital data off of a plurality of tracks of said second disk media, said fourth head moving across said single storage area of said second surface of said second disk media in a direction from an inner one of said plurality of tracks to an outer one of said plurality of tracks; and a demultiplexer circuit for receiving said digital data from said first, second, third and fourth heads and for supplying a single digital data stream therefrom wherein digital data is supplied from said first, second, third and fourth heads at a combined throughput rate that is substantially constant.

15. The digital storage device as described in claim 14 wherein said single digital data stream represents audio/video (AV) information and further comprising a mechanism for spinning said first and second disk media at a constant angular velocity.

16. A method of storing digital data comprising the steps of:
a) receiving a digital data stream;
b) supplying first portions of said digital data stream to a first head and supplying second portions of said digital data stream to a second head, wherein respective size ratios of respective first and second portions are based on corresponding track position ratios of said first and second heads;
c) traversing tracks of a first disk media from outer tracks to inner tracks with said first head and writing said first portions onto tracks of said first disk media using said first head, wherein said first disk media comprises a single storage area;
d) traversing tracks of a second disk media from inner tracks to outer tracks with said second head and writing said second portions onto tracks of said second disk media using said second head, wherein said second disk media comprises a single storage area and wherein the combined data throughput of said first head plus said second head is substantially constant; and
e) spinning said first disk media and second disk media at a constant angular velocity.

17. The method as described in claim 16 wherein said step b) comprises the step of accessing a look up table stored in a memory unit to determine said respective size ratios wherein said look-up table corresponds said respective size ratios to said associated track position ratios.

18. The method as described in claim 16 wherein said first disk media and said second disk media are magnetic disk platters.

19. The method as described in claim 16 wherein said first disk media and said second disk media are optical disks.

20. The method as described in claim 16 wherein said digital data stream represents audio/video (AV) information.

* * * * *